United States Patent
Crocker

(10) Patent No.: US 9,442,822 B2
(45) Date of Patent: Sep. 13, 2016

(54) PROVIDING A VISUAL REPRESENTATION OF A SUB-SET OF A VISUAL PROGRAM

(75) Inventor: Peter Timothy Crocker, Winchester (GB)

(73) Assignee: International Business Machines Corporation, Armonk, NY (US)

(*) Notice: Subject to any disclaimer, the term of this patent is extended or adjusted under 35 U.S.C. 154(b) by 2869 days.

(21) Appl. No.: 11/850,121

(22) Filed: Sep. 5, 2007

(65) Prior Publication Data

US 2008/0059436 A1 Mar. 6, 2008

(30) Foreign Application Priority Data

Sep. 6, 2006 (GB) .................................. 0617449.4

(51) Int. Cl.
*G06F 9/44* (2006.01)
*G06F 11/00* (2006.01)
*G06F 11/36* (2006.01)

(52) U.S. Cl.
CPC ............. *G06F 11/3612* (2013.01); *G06F 8/34* (2013.01); *G06F 11/3636* (2013.01)

(58) Field of Classification Search
CPC ................................................ G06F 11/3612
USPC ........................................................ 717/125
See application file for complete search history.

(56) References Cited

U.S. PATENT DOCUMENTS

| 5,960,199 A | 9/1999 | Brodsky et al. |
| 6,748,583 B2 | 6/2004 | Aizenbud-Reshef et al. |
| 7,380,239 B1* | 5/2008 | Srivastava et al. ............ 717/128 |
| 2002/0046262 A1* | 4/2002 | Heilig et al. ................... 709/219 |
| 2002/0120918 A1* | 8/2002 | Aizenbud-Reshef et al. .............................. 717/127 |
| 2004/0031019 A1* | 2/2004 | Lamanna et al. ............. 717/125 |

OTHER PUBLICATIONS

Tan, Shuxia, "Extending a message flow debugger for MQSeries integrator" 2001, ProQuest Dissertations and Theses, vol. 0984, Iss.0267, p. 106.*
Veitch et al., "The Rubicon Workload Characterization Tool," Storage Systems Department, Hewlett Packard Laboratories, 2001, pp. 1-17.
Yang et al., "SD2—A System for Distributed Software Development," 17th International Computer Software and Applications Conference COMPSAC '93, Nov. 1-5, 1993, pp. 131-137.

* cited by examiner

*Primary Examiner* — James D Rutten
(74) *Attorney, Agent, or Firm* — Winstead, P.C.

(57) ABSTRACT

To provide a visual representation of a sub-set of a visual program generated using a visual programming tool, wherein a trace operation is executed against the visual program and resulting trace data is stored in a trace file, an apparatus includes a parser for parsing the trace file to obtain the trace data, and a generator for using event data associated with an event and associated component data associated with a component of the visual program to generate render data. The event data and the component data are associated with the trace data.

9 Claims, 13 Drawing Sheets

TRACE FILE:

2006-01-01 11:45:01     ID_1234: MESSAGE RECEIVED AND PROPAGATED TO 'OUT'
                                          TERMINAL OF INPUT NODE 'TEST. INPUT_A'

2006-01-01 11:45:02     ID_5678: LOG–FILE CREATED 2006-01-01 11:45:03     ID_1010: MESSAGE PROPAGATED TO 'FALSE' TERMINAL
                                          OF FILTER NODE 'TEST.FILTER_A'

2006-01-01 11:45:04     ID_1111: "OUTPUT NODE 'TEST.OUTPUT-FALSE' FAILED TO OUTPUT MESSAGE
                                          TO QUEUE 'OUT' CONNECTED TO QUEUE MANAGER 'QM1'".

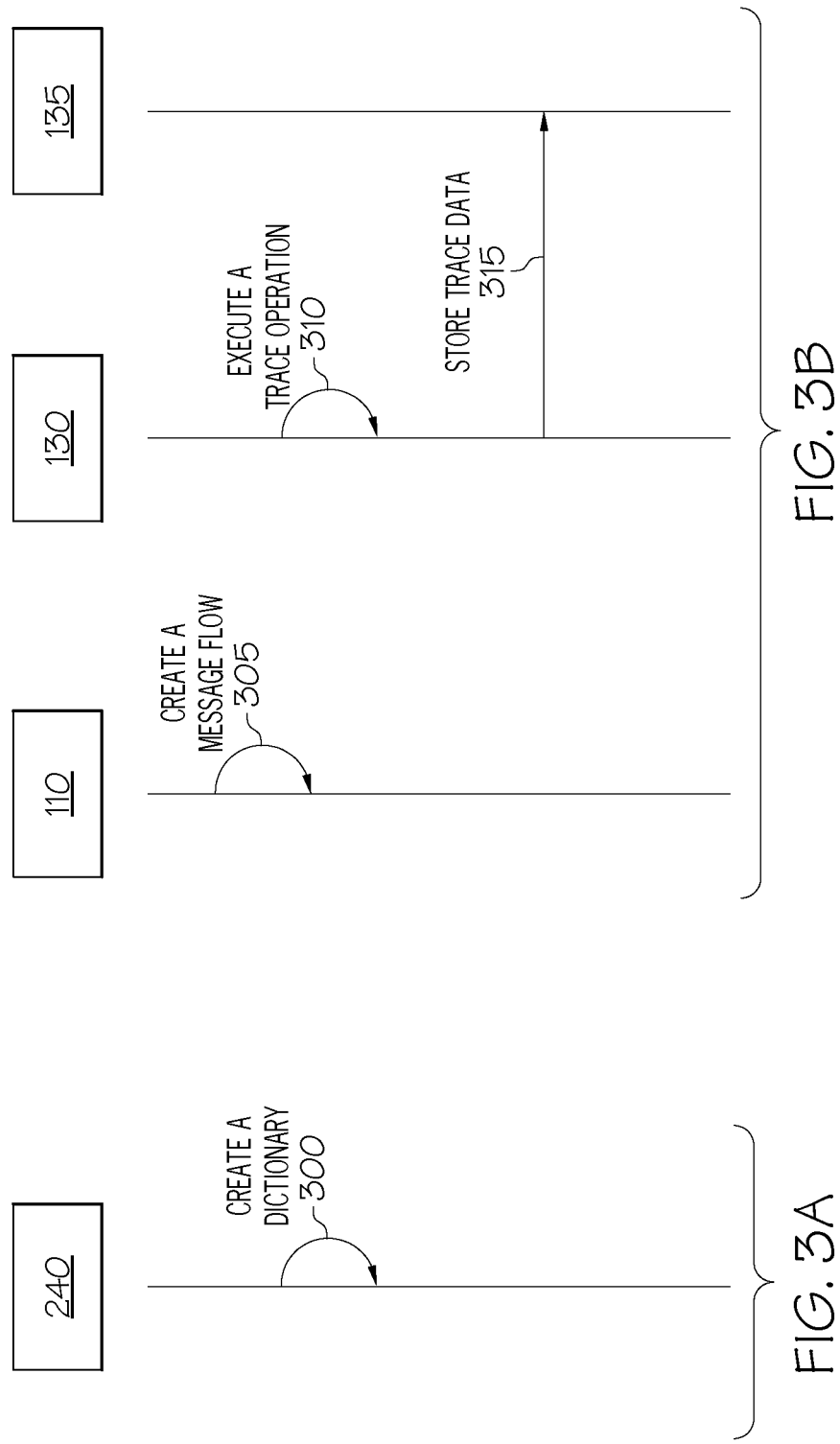

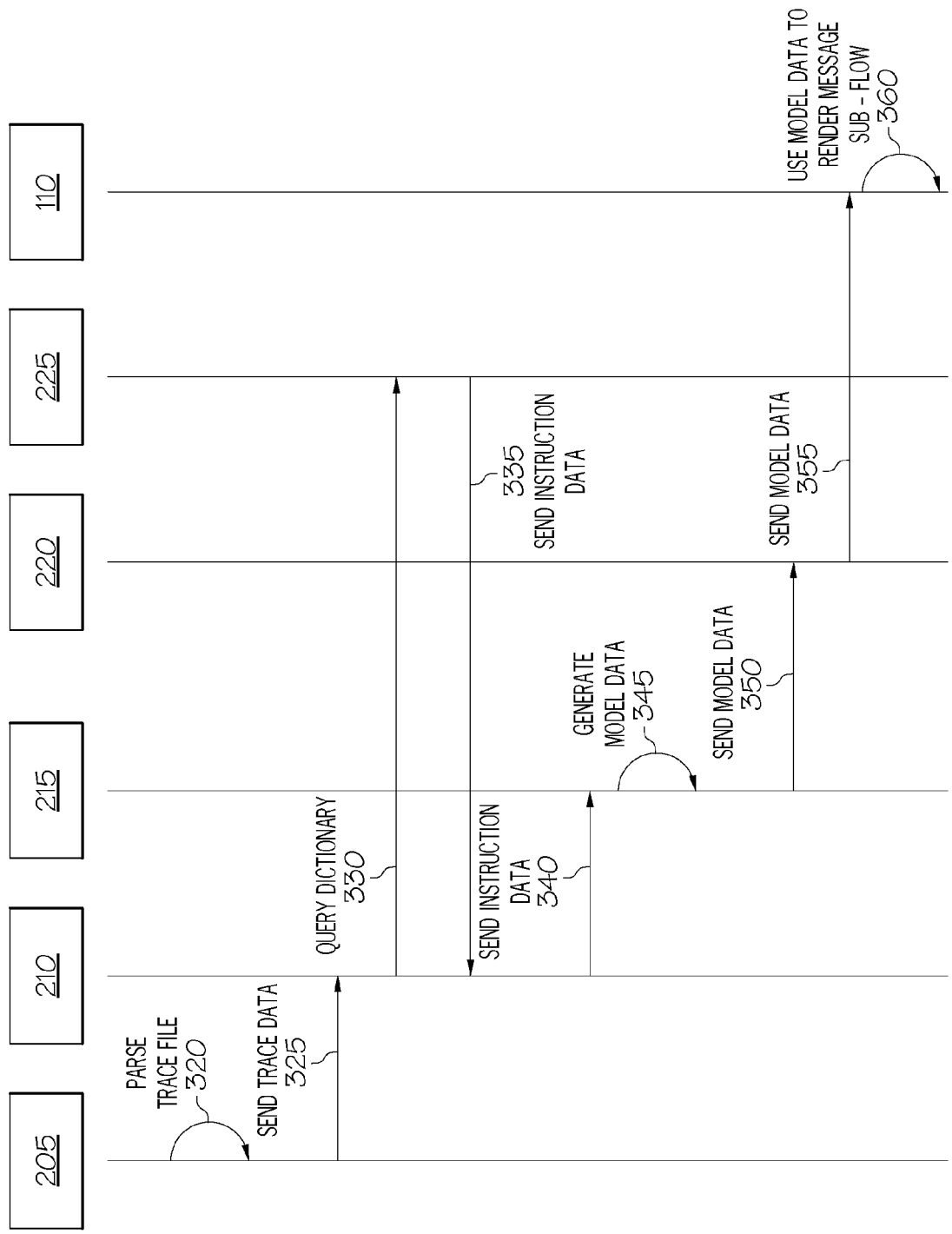

TRACE FILE:

2006-01-01 11:45:01    ID_1234: MESSAGE RECEIVED AND PROPAGATED TO 'OUT'
                               TERMINAL OF INPUT NODE 'TEST. INPUT_A'

2006-01-01 11:45:02    ID_5678: LOG-FILE CREATED 2006-01-01 11:45:03    ID_1010: MESSAGE PROPAGATED TO 'FALSE' TERMINAL
                               OF FILTER NODE 'TEST.FILTER_A'

2006-01-01 11:45:04    ID_1111: "OUTPUT NODE 'TEST.OUTPUT-FALSE' FAILED TO OUTPUT MESSAGE
                               TO QUEUE 'OUT' CONNECTED TO QUEUE MANAGER 'QM1'".

FIG. 6

DICTIONARY

| MESSAGE IDENTIFIER | INSTRUCTION FUNCTION |
|---|---|
| 1234 | ADD_NODE(TYPE = INPUT; NODE_ID = (TEST.NODE_ID); EVENT = PROPAGATED TO '(TERMINAL_ID)' TERMINAL) |
| 1010 | ADD_NODE (TYPE = FILTER; NODE_ID = (TEST.NODE_ID); EVENT = PROPAGATED TO '(TERMINAL_ID)' TERMINAL) |
| 1111 | ADD_NODE(TYPE = OUTPUT; NODE_ID = (TEST.NODE_ID); EVENT = FAILED TO OUTPUT MESSAGE TO QUEUE 'QUEUE_ID' CONNECTED TO QUEUE MANAGER 'QUEUE_MANAGER_ID') |

FIG. 7

NODE MODEL DATA

| NODE ID | TYPE | TERMINAL CONNECTIONS | PROPERTIES |
|---|---|---|---|
| INPUT_A | INPUT | "OUT" CONNECTED TO NODE [UNKNOWN] | |

SEQUENCE DATA

| SEQUENCE | NODE_ID | EVENT | TRACE TIMESTAMP |
|---|---|---|---|
| 1 | INPUT_A | PROPAGATED TO "OUT" | 2006-01-01 11:45:01 |

FIG. 8A

NODE MODEL DATA

| NODE_ID | TYPE | TERMINAL CONNECTIONS | PROPERTIES |
|---|---|---|---|
| INPUT_A | INPUT | "OUT" CONNECTED TO NODE "FILTER_A", TERMINAL "IN" | |
| FILTER_A | FILTER | "FALSE" CONNECTED TO NODE [UNKNOWN] | |

SEQUENCE DATA

| SEQUENCE | NODE_ID | EVENT | TRACE TIMESTAMP |
|---|---|---|---|
| 1 | INPUT_A | PROPAGATED TO "OUT" | 2006-01-01 11:45:01 |
| 2 | FILTER_A | PROPAGATED TO "FALSE" | 2006-01-01 11:45:03 |

FIG. 8B

NODE MODEL DATA

| NODE_ID | TYPE | TERMINAL CONNECTIONS | PROPERTIES |
|---|---|---|---|
| INPUT_A | INPUT | "OUT" CONNECTED TO NODE "FILTER_A", TERMINAL "IN" | |
| FILTER_A | FILTER | "FALSE" CONNECTED TO NODE "OUTPUT-FALSE", TERMINAL "IN" | |
| "OUTPUT-FALSE" | OUTPUT | | QUEUE NAME = "OUT", QUEUE MANAGER NAME = "QM1" |

SEQUENCE DATA

| SEQUENCE | NODE_ID | EVENT | TRACE TIMESTAMP |
|---|---|---|---|
| 1 | INPUT_A | PROPAGATED TO "OUT" | 2006-01-01 11:45:01 |
| 2 | FILTER_A | PROPAGATED TO "FALSE" | 2006-01-01 11:45:03 |
| 3 | OUTPUT-FALSE | FAILED TO OUTPUT MESSAGE TO QUEUE "OUT" CONNECTED TO QUEUE MANAGER "QM1" | 2006-01-01 11:45:04 |

FIG. 8C

NODE MODEL DATA

| NODE_ID | TYPE | TERMINAL CONNECTIONS | PROPERTIES |
|---|---|---|---|
| INPUT_A | INPUT | "OUT" CONNECTED TO NODE "FILTER_A", TERMINAL "IN" | |
| FILTER_A | FILTER | "FALSE" CONNECTED TO NODE "OUTPUT-FALSE", TERMINAL "IN" | |
| "OUTPUT-FALSE" | OUTPUT | COMPLETE | QUEUE NAME = "OUT", QUEUE MANAGER NAME = "QM1" |

SEQUENCE DATA

| SEQUENCE | NODE_ID | EVENT | TRACE TIMESTAMP |
|---|---|---|---|
| 1 | INPUT_A | PROPAGATED TO "OUT" | 2006-01-01 11:45:01 |
| 2 | FILTER_A | PROPAGATED TO "FALSE" | 2006-01-01 11:45:03 |
| 3 | OUTPUT-FALSE | FAILED TO OUTPUT MESSAGE TO QUEUE "OUT" CONNECTED TO QUEUE MANAGER "QM1" | 2006-01-01 11:45:04 |

FIG. 8D

PROVIDING A VISUAL REPRESENTATION OF A SUB-SET OF A VISUAL PROGRAM

FIELD OF THE INVENTION

The present invention provides an apparatus for providing a visual representation of a sub-set of a visual program.

BACKGROUND OF THE INVENTION

Visual programming techniques and tools allow computer programs to be developed by manipulation of visual images representing objects, providing an alternative to conventional alphanumeric-character-based programming languages. Such techniques and tools make the task of computer program development easier for programmers than was possible with earlier non-visual programming languages, and make programming accessible to non-expert programmers. Visual programming has enabled more rapid prototyping and application program development, and has generally enabled users to focus on what functions they want their program to perform by greatly reducing the requirement to learn about programming languages and the internal workings of a computer.

Nevertheless, it remains the case that the available visual programming tools and languages are mainly used for building a user interface (selecting and positioning user interface components such as buttons, scrollbars, etc, and scripting their behavior). The user is often required to rely on conventional programming techniques for implementing the logic underneath the user interface.

As with other computer programs, programs developed using visual programming techniques require debugging, but in the past many visual programming tools have not enabled visual debugging. That is, the user has been provided with source level debug information which has required a greater level of understanding of languages and systems than the original visual programming task. More recently, it has been recognized that visual programmers should be provided with visual reporting of any problems which require debugging, thereby matching the problem reporting style to the requirements of a typical visual programmer rather than relying on non-intuitive source code level debug information.

SUMMARY

According to a first aspect, the present invention provides an apparatus for providing a visual representation of a sub-set of a visual program generated using a visual programming tool, wherein a trace operation is executed against the visual program and resulting trace data is stored in a trace file; the apparatus comprising: a parser for parsing the trace file to obtain the trace data; and a generator for using event data associated with an event and associated component data associated with a component of the visual program to generate render data, wherein the event data and the component data are associated with the trace data.

According to a second aspect, the present invention provides a method for providing a visual representation of a sub-set of a visual program generated using a visual programming tool, wherein a trace operation is executed against the visual program and resulting trace data is stored in a trace file; the method comprising the steps of: parsing the trace file to obtain the trace data; and using event data associated with an event and associated component data associated with a component of the visual program to generate render data, wherein the event data and the component data are associated with the trace data.

According to a third aspect, the present invention provides a computer program comprising program code means adapted to perform all the steps of the method above when said program is run on a computer.

According to a fourth aspect, the present invention provides a visual programming tool for generating a visual program, wherein a trace operation is executed against the visual program and resulting trace data is stored in a trace file; the visual programming tool comprising: a parser for parsing the trace file to obtain the trace data; a generator for using event data associated with an event and associated component data associated with a component of the visual program to generate render data, wherein the event data and the component data are associated with the trace data; and a render component for using the render data to render a sub-set of the visual program.

Advantageously, the user's view of the visual message flow representation of the developed program is consistent with the user's understanding of messages flowing between nodes of a message processing and forwarding network, and this minimizes the requirement for a visual programmer who is familiar with messaging to learn new concepts before starting programming of message flows.

It should be understood that such an apparatus can be integrated within a visual programming tool; a message broker within a messaging network, or can be provided as a tool for use with such a broker.

BRIEF DESCRIPTION OF THE DRAWINGS

The present invention will now be described, by way of example only, with reference to preferred embodiments thereof, as illustrated in the following drawings, wherein:

FIGS. 3A to 3C are flow charts showing the operational steps involved in a process according to the preferred embodiment;

FIG. 6 is a representation of a trace file;

FIG. 7 is a representation of a dictionary;

FIGS. 8A to 8D are representations of node model data and sequence data.

DETAILED DESCRIPTION

Figure 1:
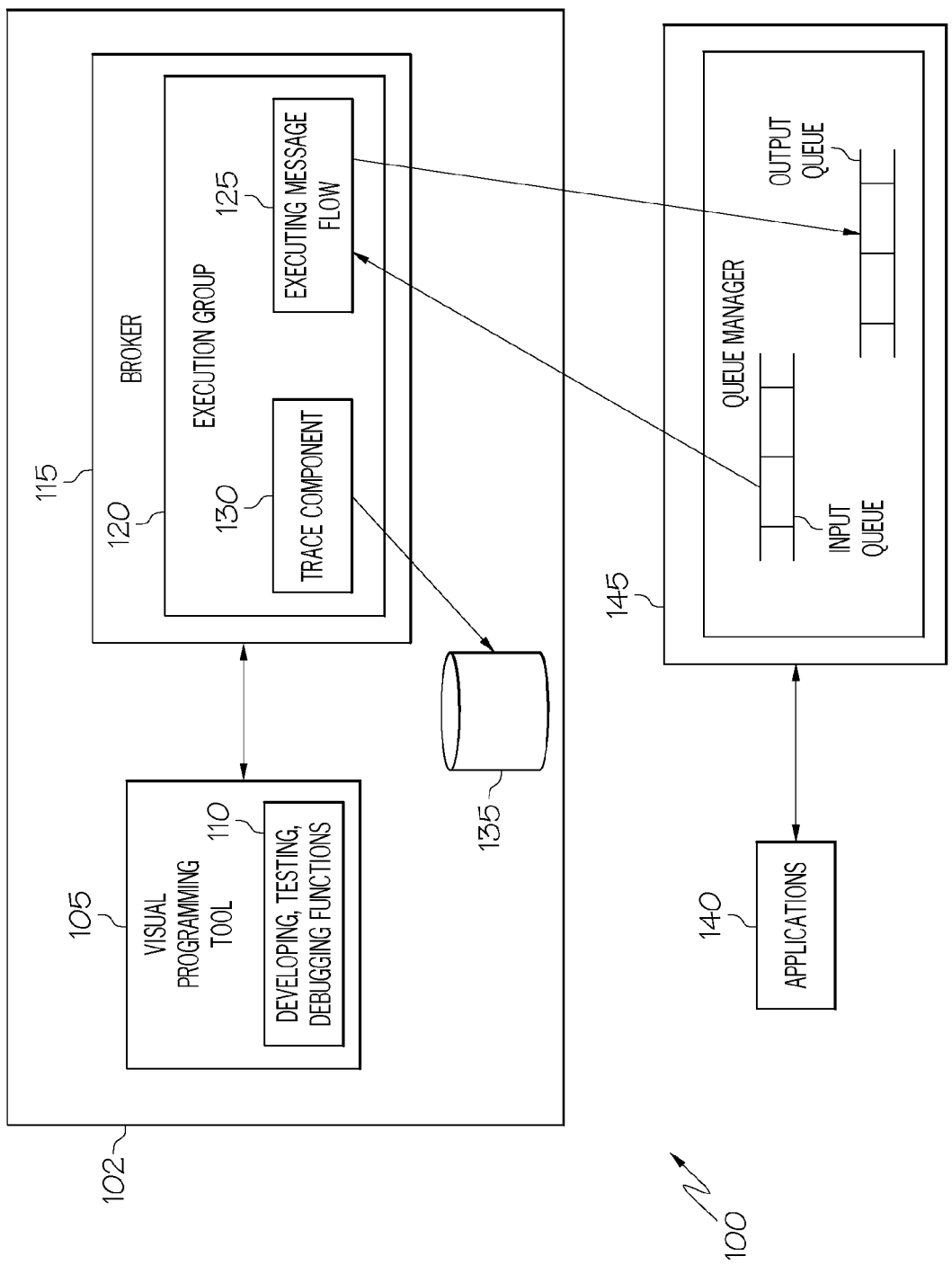
FIG. 1 is a schematic representation of a prior art visual programming environment.

An embodiment of the present invention will be described below with reference to a system (100) depicted in FIG. 1 which shows a message integration architecture (102), underlying messaging support (145) (comprising a queue manager, an input queue and an output queue), and other connected computer programs (140) of a data processing system within a messaging network. There is also shown a visual programming tool (105) providing functions (110) for developing, testing and debugging message flows (125)—visual programs for running on a message broker (115). A message broker (115) hosts an execution group (120) that in turn hosts a message flow (125).

Before describing the preferred embodiment in detail, an introduction to message queuing, message brokers and message flows will be helpful.

The ability to rapidly adopt, integrate and extend new and existing data processing technologies has become essential to the success of many businesses. Heterogeneity and change in data processing networks has become the norm, requiring communication solutions which achieve interoperability between the different systems. Application-to-application messaging via intelligent middleware products provides a solution to this problem.

For example, IBM Corporation's WebSphere MQ (IBM and WebSphere are registered trademarks of International Business Machines Corporation) messaging and queuing product family are known to support interoperation between application programs running on different systems in a distributed heterogeneous environment (IBM and WebSphere are registered trademarks of International Business Machines Corporation).

Some messaging products provide transactional messaging support, synchronizing messages within logical units of work in accordance with a messaging protocol which gives assured once and once-only message delivery even in the event of system or communications failures. Some products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure.

The message queuing inter-program communication support provided by the WebSphere MQ products, for example, enables each application program to send messages to the input queue of any other target application program and each target application can asynchronously take these messages from its input queue for processing. This provides for assured delivery of messages between application programs which may be spread across a distributed heterogeneous computer network, without requiring a dedicated logical end-to-end connection between the application programs, but there can be great complexity in the map of possible interconnections between the application programs.

This complexity can be greatly simplified by including within the network architecture a communications hub to which other systems connect, instead of having direct connections between all systems. Message brokering capabilities can then be provided at the communications hub to provide intelligent message routing and integration of applications. Message brokering functions typically include the ability to route messages intelligently according to business rules and knowledge of different application programs' information requirements, using message 'topic' information contained in message headers, and the ability to transform message formats using knowledge of the message format requirements of target applications or systems to reconcile differences between systems and applications.

Some brokering capabilities (such as that provided for example by WebSphere Message Broker) provide intelligent routing and transformation services for messages which are exchanged between application programs using messaging products.

Support for both management and development of message brokering applications can be implemented in a message broker architecture to provide functions including publish/subscribe message delivery, message transformation, database integration, message warehousing and message routing. Message flows are a visual programming technology which support all of these broker capabilities and greatly ease the task of management and development of message brokering solutions.

A message flow is a visual program which represents the sequence of operations performed by the processing logic of a message broker as a directed graph (a message flow diagram) between an input and a target (for example, an input queue and a target queue). The message flow diagram consists of message processing nodes, which are representations of processing components, and message flow connectors between the nodes.

Message processing nodes are predefined components, each performing a specific type of processing on an input message. The processing undertaken by these nodes may cover a range of activities, including reformatting of a message, transformation of a message (e.g. adding, deleting, or updating fields), routing of a message, archiving a message into a message warehouse, or merging of database information into the message content.

There are two basic types of message processing nodes: endpoints and processing nodes. Endpoints represent points in the message flow from which messages originate (input nodes) or to which messages are sent (output nodes). Endpoints are associated with data structures such as queues. Applications can interact with a message flow by sending/receiving messages on these protocols e.g. by putting and getting messages on/from a queue.

Processing nodes take a message as input and transform it into zero, one, or more output messages. Each such message processing node has a set of "input terminals" through which it receives messages, and a set (possibly empty) of "output terminals", through which it propagates the processed message.

Message processing nodes have properties which can be customized. These properties may include expressions that are used by the processing node to perform its processing on input messages.

A message flow is created by a visual programmer using a visual programming tool such as provided in IBM Corporation's WebSphere Message Broker Toolkit.

Figure 4:
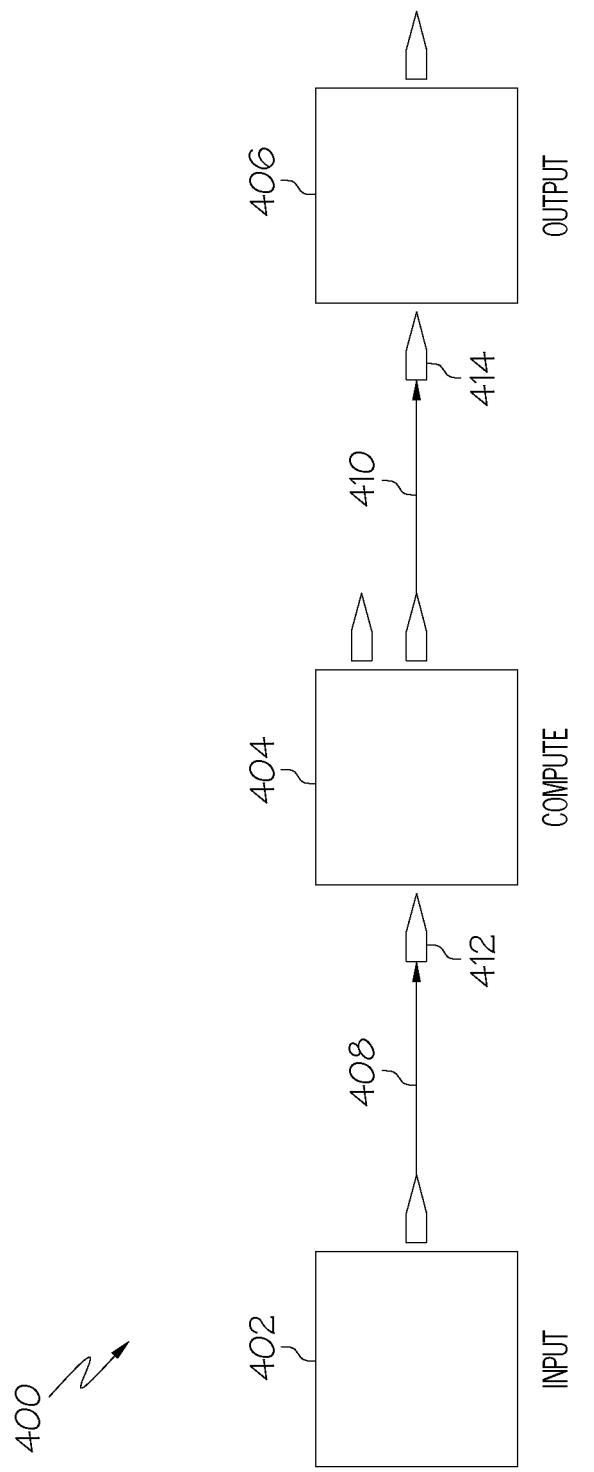
FIG. 4 is a schematic representation of an example message flow.

With reference to FIG. 4, a visual programmer creates a message flow (400) by placing message processing nodes (i.e. 402, 404 and 406) on a drawing surface, and connecting the output terminal of one node (408 and 410) to the input terminal (412 and 414 respectively) of another node. These connections determine the flow of the messages through the message processing nodes—i.e. the order in which nodes process a message. A message flow can contain a compound message processing node which is itself a message flow. In this way message flows can be built modularly, and specific message processing functionality can be reused.

Message flows are executed by an execution engine that can read a description of a message flow, and invoke the appropriate runtime code for each message processing node.

The queuing of an input message on an input queue initiates execution of the message flow on the queued message. The message is then propagated to the target nodes of the connectors originating from the output terminal of the input node. If there is more than one outgoing connector, copies of the message are created and handled independently by the subsequent nodes. If the node is an output node, the message is delivered to the associated message queue; otherwise the processing node will create zero or more output messages for one or more of its output terminals. Messages are propagated to subsequent nodes as described above.

A processing node will process an input message as soon as it arrives. A processing node might output more than one message of the same type through an output terminal and several copies of the same message might be propagated if there is more than one connector originating from an output terminal; all of these messages are processed independently. A processing node does not necessarily produce output messages for all of its output terminals—often it will produce one output for a specific terminal depending on the specific input message. Also, a node might produce messages for output terminals that are not connected to other processing nodes, in which case the message is not processed further.

Once a message flow has been programmed, a visual programmer's next step is to verify that the flow behaves correctly before integrating it into an operational messaging system. In order to verify the behavior of a message flow, a developer can provide some input messages to the message flow and execute them through a debugger (110) to determine whether the expected actions are executed.

For example, to make use of the debugger (110) provided in IBM Corporation's WebSphere Message Broker Toolkit, breakpoints must be added to a message flow in order to track the progress and status of any messages passing through the flow. A breakpoint is a point defined between nodes in a message flow at which point progress of a message is stopped by the debugger (110) so that the message can be examined and altered. Thus, the progress of a message thorough a message flow can be monitored as well as content associated with the message. Movement of a message through a message flow can be controlled. A visual programmer can also "step" into source code, message mappings etc.

It is helpful for a visual programmer to view a message flow using a debugger as the way in which a message is handled and rolled back when an error occurs is shown.

It should be understood that the debugger (110) is executed against an "in flight" (i.e. executing) message flow.

Tracing can also be used against an execution group in order to determine trace data associated with events occurring as a message passes through a message flow. Tracing can result in a decrease in performance due to the extra processing that is required as well as file accesses required for writing of a trace file. Typically a trace component (130) provides different types and levels of trace operations e.g. resulting in different amount of information.

Trace data (typically textual data) from a trace operation is stored in a trace file (135). Thus, although a trace operation is executed against an executing message flow, trace data is stored separately from the executing message flow.

Typically, trace data provides a greater amount of detail associated with events occurring as a message passes through a message flow than a debugging operation. However, since trace data is stored separately from the executing message flow, data associated with the message flow (e.g. configuration data etc.) cannot be altered.

It should be understood that trace data can be difficult for a visual programmer to decipher because the development environment is presented visually but the trace data is not so presented.

Thus, there is a need for an improved mechanism for providing a visual programmer with trace data associated with a message flow.

The preferred embodiment will now be described with reference to the figures. The preferred embodiment provides a mechanism to allow for rendering of a sub-set of a message flow, wherein the sub-set is associated with trace data.

Figure 2:
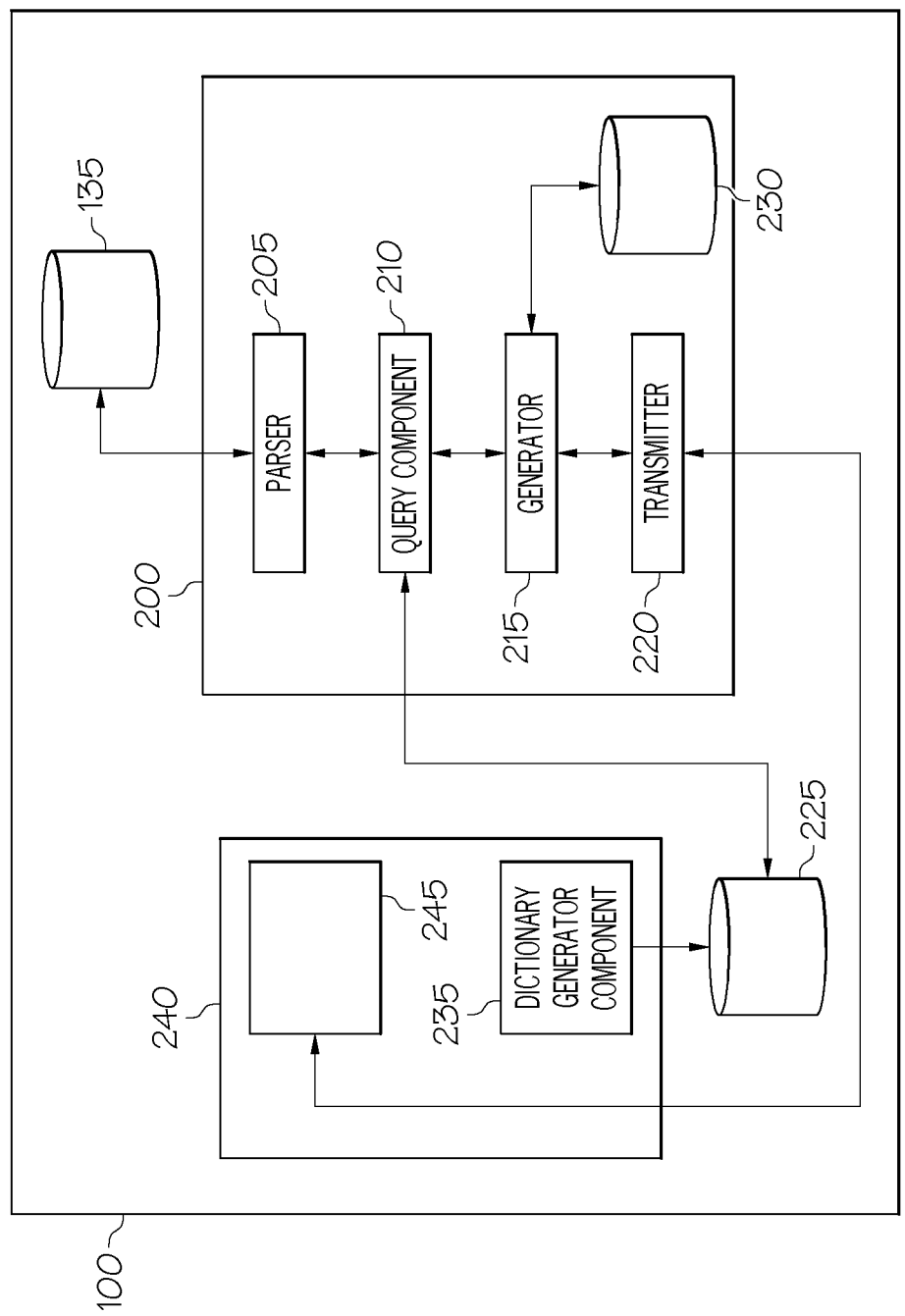
FIG. 2 is a schematic representation of an apparatus according to the preferred embodiment.

With reference to FIG. 2, the visual programming tool (240) comprises a dictionary generator component (235) for creating a dictionary (225).

An apparatus (200) according to the preferred embodiment is also depicted in FIG. 2. The apparatus (200) comprises a parser (205) operable to access and parse the trace file (135); a query component (210) operable to communicate with the parser (205) and the dictionary (225); a generator (215) operable to communicate with the query component (210), a storage component (230) and a transmitter (220); wherein the transmitter (220) is operable to communicate with one or more of the functions (245) associated with the visual programming tool (240).

Pre-processing steps are depicted in FIG. 3A and FIG. 3B and steps involved in a process according to the preferred embodiment are depicted in FIG. 3C.

At step 300, in a pre-processing step, with reference to FIG. 3A and FIG. 7, a dictionary component (235) creates a dictionary (225).

Preferably, the dictionary (225) comprises data associated with an event and associated components of the message flow.

In the example described herein, the dictionary comprises data associated with known trace message identifiers (e.g. in the "Message ID:" field). A message identifier is associated with an event that generated an associated message. In the example described herein, a particular message identifier is associated with a particular event (and therefore, with particular associated components).

The dictionary comprises an instruction function associated with a message identifier. In response to invoking the instruction function, instruction data is generated. The instruction data represents data that is to be used for rendering a sub-set of a message flow.

In an alternative embodiment, a dictionary (225) can be created by a developer of the visual programming tool (240) as the dictionary preferably conforms to a format associated with the visual programming tool (240). Preferably, the dictionary (225) can be updated.

Figure 5:
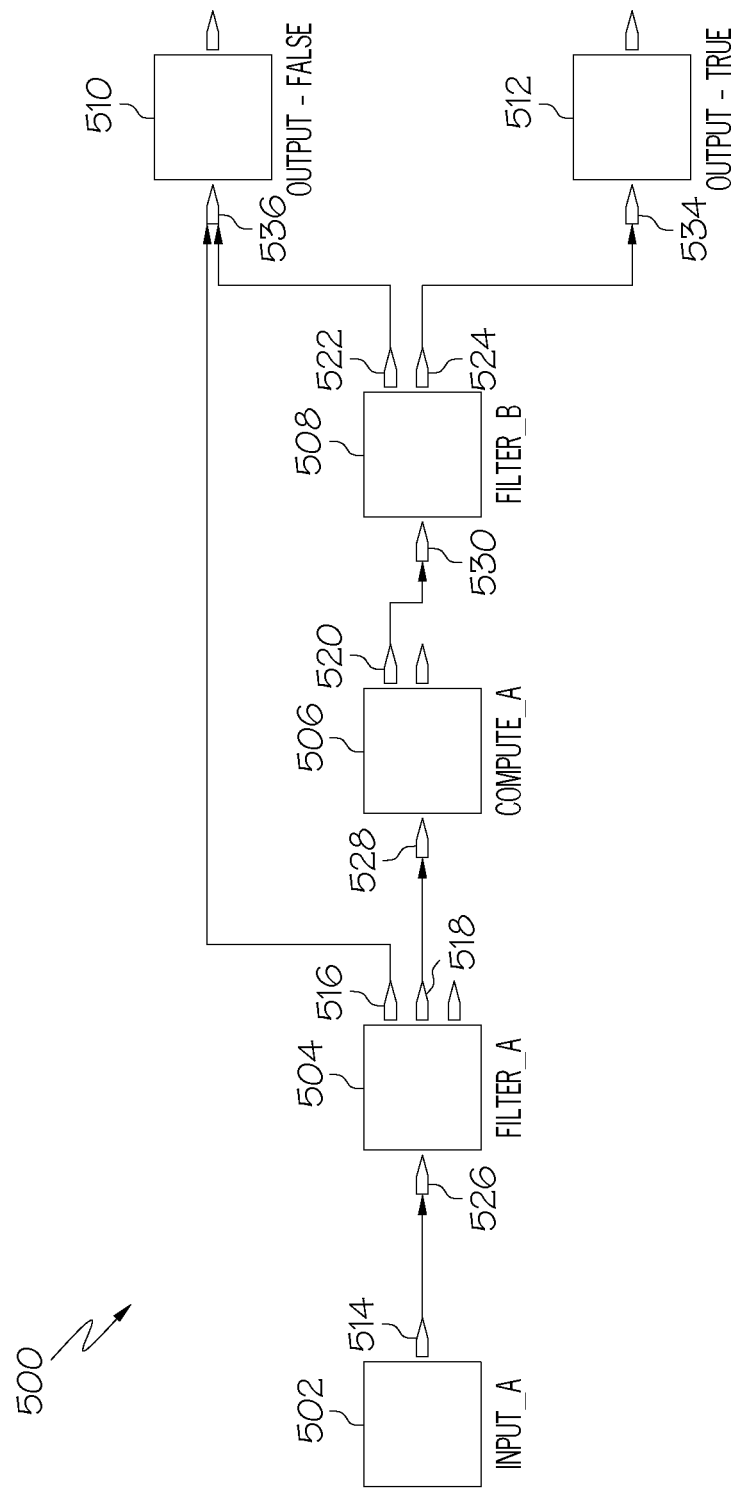
FIG. 5 is a schematic representation of an entire message flow according to a preferred embodiment.

At step 305, in a pre-processing step, with reference to FIG. 3B and FIG. 5, a visual programmer uses one or more development toolkit functions (245) to create a message flow (500) by placing message processing nodes (i.e. 502, 504, 506, 508, 510 and 512) on a drawing surface.

The output terminal of one node (514, 516, 518, 520, 522 and 524) is connected to an input terminal (526, 528, 530, 532 and 534) of another node.

At step 310, a trace component (130) is run such that a first trace operation is executed against the executing message flow (500). Trace data resulting from the first trace operation is stored (step 315) in a trace file (135).

An example of the trace file (135) is shown in FIG. 6. Each entry of the trace file comprises a timestamp (e.g. "2006-01-01 11:45:01"); a message identifier (e.g. "ID_1234") and a message (e.g. "Message received and propagated to 'Out' terminal of input node 'test.Input_A').

A process according to the preferred embodiment will now be described with reference to FIG. 3C.

At step 320, the parser (205) accesses and parses the trace file (135) (depicted in FIG. 6). As described above, the trace file (135) can be accessed without connecting to an executing message flow.

The parser (205) is pre-configurable to detect within a trace file entry, at least one of: a timestamp, a message identifier and a message.

At step 325, the parser (205) sends trace data associated with the first trace file entry to the query component (210). In the example described herein, the trace data comprises a message identifier "ID_1234" and a message "Message received and propagated to 'Out' terminal of input node 'test.Input_A'".

At step 330, the query component (210) uses the trace data to query the dictionary (225).

Firstly, the query component (210) uses the message identifier "ID_1234" to query the dictionary (225) in order to determine whether the message identifier is comprised in the dictionary (225).

With reference to FIG. 7, in the example described herein, the message identifier "ID_1234" is comprised in the dictionary (225) and in response, the dictionary (225) preferably generates a response (e.g. wherein the response comprises a Boolean value representing "True").

In response to the message identifier "ID_1234" being comprised in the dictionary (225), the query component (210) uses the message "Message received and propagated to 'Out' terminal of input node 'test.Input_A'" to query the dictionary (225). Alternatively, it should be understood that a single query comprising the message identifier and the message can be sent by the query component (210) to the dictionary (225).

In response to the query, the dictionary (225) generates a response comprising instruction data by invoking an instruction function associated with the message identifier. In the example described herein, the dictionary (225) invokes an instruction function associated with adding a node (specified by the "add_node" function).

The add_node function comprises a number of parameters specifying a type of node (i.e. "type=Input"); a node identifier (i.e. node_ID=(test.node_ID)) that is determined by matching a string "(test.node_ID)" against the trace data; and an event.

In the example described herein, in response to invoking the instruction function associated with the message identifier "ID_1234" (wherein the event parameter (i.e. "event") specifies that a message is propagated to an output terminal having a terminal identifier of the identified node. The event parameter is determined by matching a string "propagated to 'terminal_ID' terminal" against the trace data), the following instruction data is generated:

Instruction Data:
add_node(type=Input; node_ID=Input_A; event=propagated to 'Out' terminal)

At step 335, the dictionary (225) sends the instruction data to the query component (210), which sends (step 340) the instruction data to the generator (215).

At step 345, the generator (215) uses the instruction data to generate render data associated with rendering of a sub-set of the message flow. The render data comprises node model data and sequence data. Preferably, the node model data is associated with a node and the sequence data is associated with an event.

The node model data comprises a node identifier (i.e. Input_A) and a node type (i.e. Input).

The node model data further comprises terminal connections data wherein the data is associated with a connector originating from an output terminal of the node identified in the instruction data and a node identifier and terminal identifier of a target node.

The generator (215) is configured to derive the terminal connections data from the instruction data associated with a subsequent sequence identifier. If a subsequent sequence identifier cannot be generated, for terminal connections data associated with a "last" sequence identifier, the generator (215) is configured to indicate no further terminal connections data is available (e.g. by adding the text "Complete").

Thus, in the example described herein, as a subsequent sequence identifier has not yet been generated, the terminal connections data can not yet be completed.

The node model data further comprises properties data associated with properties of further components of the message flow (e.g. queues, queue managers etc.). In the example described herein, properties data cannot be derived from the instruction data.

The sequence data comprises a sequence identifier assigned to the instruction data in the order by which the generator (215) receives the instruction data. Alternatively, the generator uses timestamp data associated with the trace file entry used to generate the instruction data as a sequence identifier.

In the example described herein, the generator (215) associates the instruction data with sequence identifier "1".

The sequence data further comprises a node identifier (i.e. Input_A). The sequence data further comprises event data (i.e. propagated to 'Out') wherein the event data is therefore associated with a sequence of events. The sequence data further comprises timestamp data of an associated trace file entry.

A representation of the node model data and the sequence data is shown in FIG. 8A.

Preferably, the generator (215) stores the node model data and the sequence data in memory (230).

With reference to FIG. 6, the parser (205) checks the trace file (135) to determine whether there are further trace file entries. In the example described herein, the parser (205) determines that there are further trace file entries and in response, the parser (205) parses (step 320) the second trace file entry and sends (step 325) trace data associated with the second trace file entry to the query component (210). In the example described herein, the trace data comprises a message identifier "ID_5678" and a message "Log-file created".

At step 330, the query component (210) uses the trace data to query the dictionary (225).

Firstly, the query component (210) uses the message identifier "ID_5678" to query the dictionary (225) in order to determine whether the message identifier is comprised in the dictionary (225).

With reference to FIG. 7, in the example described herein, the message identifier "ID_5678" is not comprised in the dictionary (225) and in response, preferably the dictionary (225) generates a response (e.g. wherein the response comprises a Boolean value representing "False").

It should be understood that during generation of a dictionary (225), preferably, a message identifier (and associated message) associated with an event that is less relevant for the generation of a sub-set of the message flow is not included in the dictionary (225). Alternatively, such a message identifier (and associated message) can be in included in the dictionary (225)—however, upon a query for such a message identifier preferably a response is generated informing the query component (210) that the message identifier is less relevant.

In response to the message identifier "ID_5678" not being comprised in the dictionary (225), with reference to FIG. 6, the parser (205) checks the trace file (135) to determine whether there are further trace file entries. In the example described herein, the parser (205) determines that there are further trace file entries and in response, the parser (205) parses (step 320) the third trace file entry and sends (step 325) trace data associated with the third trace file entry to the query component (210). In the example described herein, the trace data comprises a message identifier "ID_1010" and a message "Message propagated to 'False' terminal of filter node 'test.Filter_A'".

At step 330, the query component (210) uses the trace data to query the dictionary (225).

Firstly, the query component (210) uses the message identifier "ID_1010" to query the dictionary (225) in order to determine whether the message identifier is comprised in the dictionary (225).

With reference to FIG. 7, in the example described herein, the message identifier "ID_1010" is comprised in the dictionary (225) and in response, preferably the dictionary (225) generates a response (e.g. wherein the response comprises a Boolean value representing "True").

In response to the message identifier "ID_1010" being comprised in the dictionary (225), the query component (210) uses the message "Message propagated to 'False' terminal of filter node 'test.Filter_A'" to query the dictionary (225).

In response to the query, the dictionary (225) generates a response comprising instruction data by invoking an "add_node" function associated with the message identifier.

The add_node function comprises a number of parameters specifying a type of node (i.e. "type=Filter"); a node identifier (e.g. node_ID=(test.node_ID)) that is determined by matching a string "(test.node_ID)" against the trace data; and an event.

In the example described herein, in response to invoking the instruction function associated with the message identifier "ID_1010" (wherein the event parameter (i.e. "event") specifies that a message is propagated to an output terminal having a terminal identifier of the identified node. The event parameter is determined by matching a string "propagated to 'terminal_ID' terminal" against the trace data), the following instruction data is generated:

Instruction Data:
add_node(type=Filter;           node_ID=Filter_A;
event=propagated to 'False' terminal)

At step 335, the dictionary (225) sends the instruction data to the query component (210), which sends (step 340) the instruction data to the generator (215).

At step 345, the generator (215) uses the instruction data to generate associated node model data and sequence data.

The node model data comprises a node identifier (i.e. Filter_A) and a node type (i.e. Filter). For the entry associated with Filter_A, as a subsequent sequence identifier has not yet been generated, the terminal connections data can not yet be completed. In the example described herein, properties data cannot be derived from the instruction data.

For the entry associated with Input_A, as a subsequent sequence identifier has been generated (i.e. "2"), the node model data further comprises terminal connections data of a connector originating from the output terminal of a node (i.e. Input_A) identified in the instruction data and a node identifier and terminal identifier of a target node (i.e. Filter_A).

The sequence data comprises a sequence identifier assigned to the instruction data. In the example described herein, the generator (215) associates the instruction data with sequence identifier "2".

The sequence data further comprises a node identifier (i.e. Filter_A), event data (i.e. propagated to 'False') and timestamp data of an associated trace file entry.

A representation of the model data is shown in FIG. 8B.

Preferably, the generator (215) stores the node model data and the sequence data in memory (230).

With reference to FIG. 6, the parser (205) checks the trace file (135) to determine whether there are further trace file entries. In the example described herein, the parser (205) determines that there are further trace file entries and in response, the parser (205) parses (step 320) the fourth trace file entry and sends (step 325) trace data associated with the fourth trace file entry to the query component (210). In the example described herein, the trace data a message identifier "ID_1111" and a message "Output node 'test.Output-FALSE' failed to output message to queue 'OUT' connected to queue manager 'QM1'".

At step 330, the query component (210) uses the trace data to query the dictionary (225).

Firstly, the query component (210) uses the message identifier "ID_1111" to query the dictionary (225) in order to determine whether the message identifier is comprised in the dictionary (225).

With reference to FIG. 7, in the example described herein, the message identifier "ID_1111" is comprised in the dictionary (225) and in response, preferably the dictionary (225) generates a response (e.g. wherein the response comprises a Boolean value representing "True").

In response to the message identifier "ID_1111" being comprised in the dictionary (225), the query component (210) uses the message "Output node 'test.Output-FALSE' failed to output message to queue 'OUT' connected to queue manager 'QM1'" to query the dictionary (225).

In response to the query, the dictionary (225) generates a response comprising instruction data by invoking an "add_node" function associated with the message identifier.

The add_node function comprises a number of parameters specifying a type of node (i.e. "type=Output"); a node identifier (e.g. node_ID=(test.node_ID)) that is determined by matching a string "(test.node_ID)" against the trace data and an event.

In the example described herein, in response to invoking the instruction function associated with the message identifier "ID_1111" (wherein the event parameter (i.e. "event") specifies that a message has failed to output to a queue connected with a queue manager. The event parameter is determined by matching a string "failed to output message to queue 'queue_ID' connected to queue manager 'queue_manager_ID' against the trace data), the following instruction data is generated:

Instruction Data:
add_node(type=OUTPUT;        node_ID=Output-FALSE;
  event=failed to output message to queue 'OUT' connected
  to queue manager 'QM1')

At step 335, the dictionary (225) sends the instruction data to the query component (210), which sends (step 340) the instruction data to the generator (215).

At step 345, the generator (215) uses the instruction data to generate associated node model data and the sequence data.

The node model data comprises a node identifier (i.e. Output-FALSE) and a node type (i.e. Output). For the entry associated with Output_A, as a subsequent sequence identifier has not yet been generated, the terminal connections data can not yet be completed.

In the example described herein, properties data can be derived from the instruction data, that is, an identifier (e.g.

'OUT') associated with a queue and an identifier (e.g. 'QM1') associated with a queue manager.

For the entry associated with Filter_A, as a subsequent sequence identifier has been generated (e.g. "3"), the node model data further comprises terminal connections data of a connector originating from the output terminal of a node (e.g. Filter_A) identified in the instruction data and a node identifier and terminal identifier of a target node (e.g. Output-FALSE).

The sequence data comprises a sequence identifier assigned to the instruction data. In the example described herein, the generator (215) associates the instruction data with sequence identifier "3".

The sequence data further comprises a node identifier (e.g. Output-FALSE), event data (e.g. failed to output message to queue 'OUT' connected to queue manager 'QM1') and timestamp data of an associated trace file entry.

A representation of the model data is shown in FIG. 8C.

Preferably, the generator (215) stores the node model data and the sequence data in memory (230).

With reference to FIG. 6, the parser (205) checks the trace file (135) to determine whether there are further trace file entries. In the example described herein, the parser (205) determines that there are no further trace file entries and in response, the parser (205) thereby notifies the generator (215).

In response, the generator (215) determines that a subsequent sequence identifier cannot be generated. Thus, for flow data associated with a "last" sequence identifier (e.g. "3"), the generator (215) is configured to indicate that a flow has completed (e.g. wherein the flow data comprises the text "Complete").

A representation of the model data is shown in FIG. 8D.

At step 350, the generator (215) sends the node model data and sequence data depicted in FIG. 8D to the transmitter (220).

Preferably, the parser (205) passes associated trace file entries to the transmitter (220).

At step 355, the transmitter (220) sends the node model data, the sequence data and the trace file entries to one or more functions (245) associated with the development toolkit (240).

At step 360, one or more existing functions (245) of the development toolkit (240) use the node model data, the sequence data and the trace file entries to render a sub-set of the originally developed message flow depicted in FIG. 5.

For example, the node model data is used to generate a node type (e.g. Input), an associated node identifier (e.g. Input_A), a connector originating from an output terminal of the node to an input terminal of a target node. The properties data can optionally be displayed.

The sequence identifier data is used to build a sequence of nodes of the message flow. The event data is used to generate a sequence of events. The timestamp data and the associated trace files entry is used to display the associated trace file entry.

Figure 9:
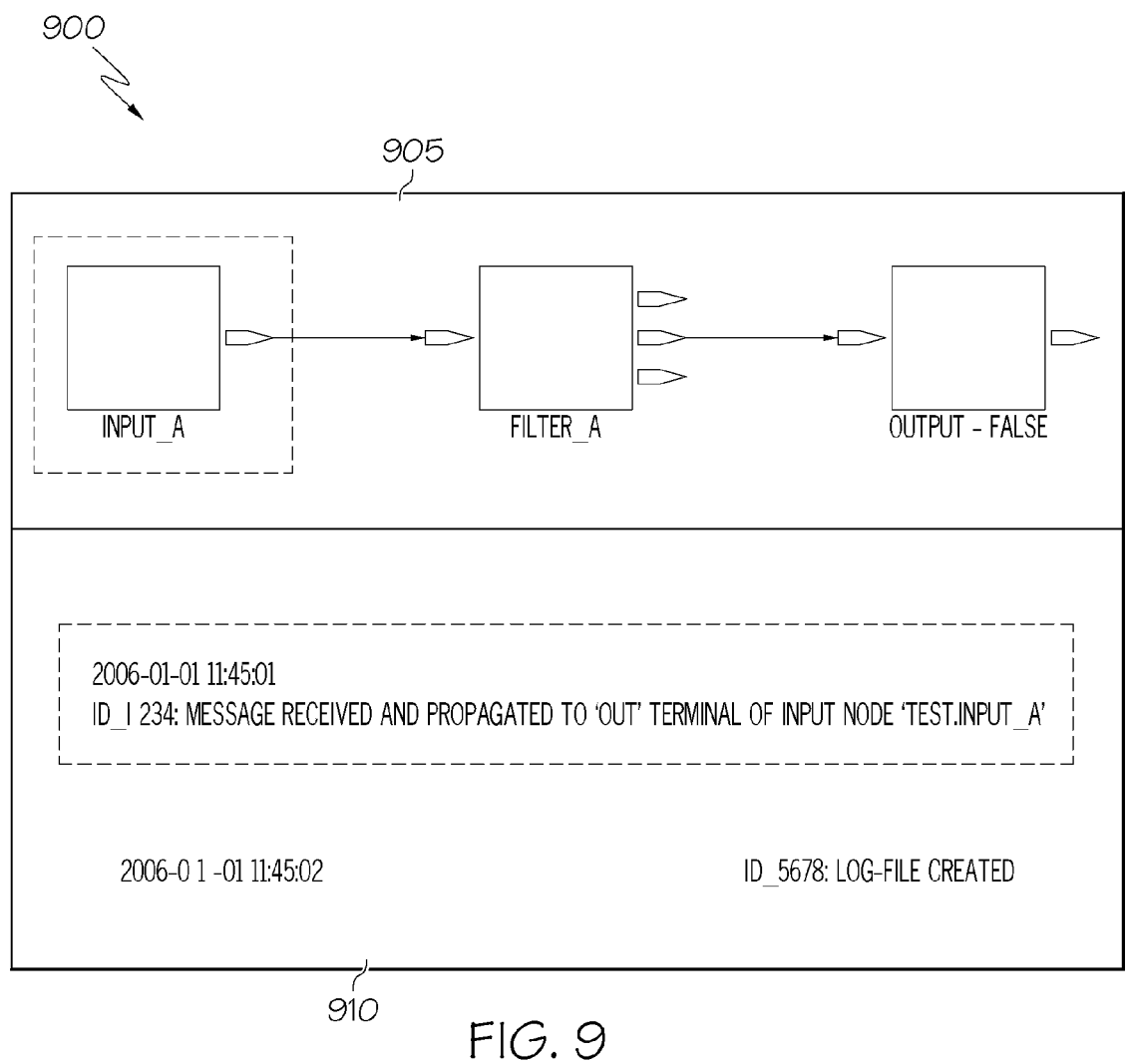
FIG. 9 is a representation of a visual representation of a sub-set of the entire message flow depicted in FIG. 5.

A representation of the depiction of the sub-set of the originally developed message flow is shown in FIG. 9, wherein there is shown a display area (900) comprising a first sub-area (905) in which the sub-set of the originally developed message flow is depicted. Preferably, a second sub-area (910) is used to display data associated with the sub-set of the originally developed message flow. For example, when a user hovers over a node (e.g. "Input_A") depicted in the sub-set, trace data (e.g. textual trace data) associated with the node is highlighted.

Advantageously, the apparatus of the preferred embodiment provides the visual programmer with a visual representation of a sub-set of the message flow. The sub-set is associated with trace data captured in the trace file (135) during execution of the entire message flow. For example, the trace data can represent errors that occurred during execution of the message flow.

As a visual programmer is thereby presented with a sub-set of the message flow that is determined from trace data, advantageously, a visual programmer is able to associate diagnostic data with the visual development environment with which they are familiar.

Furthermore, an entire message flow can be very complex and clutter the display. Thus, by allowing a visual programmer to focus on a sub-set of the message flow, analysis of any errors etc. is easier.

It should be understood that further data associated with a trace file entry can be presented to the user with the sub-set of the message flow. For example, content associated with program procedures can be provided. In another example, a thread identifier associated with a message flow can be provided—wherein the thread identifier enables a particular message flow to be distinguished from another message flow executing simultaneously wherein the another message flow is associated with another thread identifier.

In the example described herein, a trace file entry comprises a message identifier associated with an event (e.g. a particular node type etc.). If a trace file entry does not comprise such a message identifier (or equivalent), preferably the query component uses the entire trace file entry to query the dictionary.

In the example described herein, the query component (210) queries the dictionary (225) with a single entry from the trace file. It should be understood that the query component (210) can query with any number of entries—for example, by querying the dictionary (225) with a plurality of entries, more context and content associated with a sub-set of the message flow may be provided.

It should be understood that the apparatus of the preferred embodiment can be implemented with any number of visual programming tools and underlying technical infrastructures.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, the preferred embodiment of the present invention may be realized in the form of computer implemented method of deploying a service comprising steps of deploying computer program code operable to, when deployed into a computer infrastructure and executed thereon, cause said computer system to perform all the steps of the described method.

It will be clear to one skilled in the art that many improvements and modifications can be made to the foregoing exemplary embodiment without departing from the scope of the present invention.

What is claimed is:

1. An apparatus for providing a visual representation of a sub-set of a visual program generated using a visual programming tool, wherein a trace operation is executed against the visual program and resulting trace data is stored in a trace file; the apparatus comprising a processor and a memory, the apparatus further comprising:
   a parser for parsing the trace file to obtain the trace data; and
   a generator for using event data associated with an event and associated component data associated with a component of the visual program to generate render data, wherein the event data and the component data are associated with the trace data, wherein the event data has an associated sequence identifier associated with a sequence of events.

2. An apparatus for providing a visual representation of a sub-set of a visual program generated using a visual programming tool, wherein a trace operation is executed against the visual program and resulting trace data is stored in a trace file; the apparatus comprising a processor and a memory, the apparatus further comprising:
   a parser for parsing the trace file to obtain the trace data;
   a generator for using event data associated with an event and associated component data associated with a component of the visual program to generate render data, wherein the event data and the component data are associated with the trace data; and
   a dictionary generator component for generating a dictionary comprising event data and associated component data.

3. An apparatus as claimed in claim 2, wherein the event data and associated component data are selectively added to the dictionary in accordance with a selection policy.

4. An apparatus as claimed in claim 3, wherein the selection policy is associated with rendering of the sub-set of the visual program.

5. An apparatus as claimed in claim 2, wherein the dictionary is associated with a format supportable by the visual programming tool.

6. An apparatus for providing a visual representation of a sub-set of a visual program generated using a visual programming tool, wherein a trace operation is executed against the visual program and resulting trace data is stored in a trace file; the apparatus comprising a processor and a memory, the apparatus further comprising:
   a parser for parsing the trace file to obtain the trace data;
   a generator for using event data associated with an event and associated component data associated with a component of the visual program to generate render data, wherein the event data and the component data are associated with the trace data;
   a dictionary generator component for generating a dictionary comprising event data and associated component data; and
   a query component for using the trace data to query the dictionary.

7. An apparatus as claimed in claim 6, wherein the dictionary, in response to the query, is operable to return the event data and the associated component data.

8. An apparatus as claimed in claim 7, wherein the query component is operable to pass the returned event data and the associated component data to the generator for using event data.

9. A method for providing a visual representation of a sub-set of a visual program generated using a visual programming tool, wherein a trace operation is executed against the visual program and resulting trace data is stored in a trace file; the method comprising the steps of:
   parsing the trace file to obtain the trace data;
   using, by a processor, event data associated with an event and associated component data associated with a component of the visual program to generate render data, wherein the event data and the component data are associated with the trace data; and
   generating a dictionary comprising event data and associated component data.

* * * * *